United States Patent [19]
Bontekoe et al.

[11] Patent Number: 6,078,225
[45] Date of Patent: Jun. 20, 2000

[54] SWITCHING ALGORITHM FOR CLOCK DISTRIBUTION FUNCTION

[75] Inventors: Hendricus M. Bontekoe, Huizen; Willem Van Den Bosch, Loenen Aan De Vecht, both of Netherlands

[73] Assignee: Lucent Technologies Inc., Murray Hill, N.J.

[21] Appl. No.: 09/119,551

[22] Filed: Jul. 21, 1998

[51] Int. Cl.[7] ........................................................ G06F 1/04
[52] U.S. Cl. ............................ 331/14; 331/1 A; 331/74; 327/144; 327/150
[58] Field of Search ................................ 331/1 A, 74, 14, 331/18; 327/156, 159, 160, 141, 144, 150; 395/184.01; 713/500

[56] References Cited

U.S. PATENT DOCUMENTS 5,903,748   5/1999   McCollough et al. .

Primary Examiner—Arnold Kinkead

[57] ABSTRACT

An output clock signal is generated from a selected input clock signal using a phase-locked loop (PLL). The output clock signal is used to detect failures in the selected input clock signal. If a failure is detected, a backup input clock signal is used to generate the output clock signal. In one embodiment, a clock detector has a counter that is initialized based on the selected input clock signal and incremented based on the output clock signal. The clock detector detects a failure in the selected input clock signal if (1) the counter is reset too early or too late, as determined by the counter value, or (2) the signal level in the selected input clock signal does not change within a specified time period. Upon detection of a clock-signal failure, the clock detector switches to a backup input clock signal and, depending on the magnitude of the phase offset between the failed input clock signal and the backup input clock signal, temporarily changes the divisor value used by the PLL and applies a phase build-out sequence. The present invention is designed to achieve hitless or at least near hitless switching between timing functions.

19 Claims, 6 Drawing Sheets

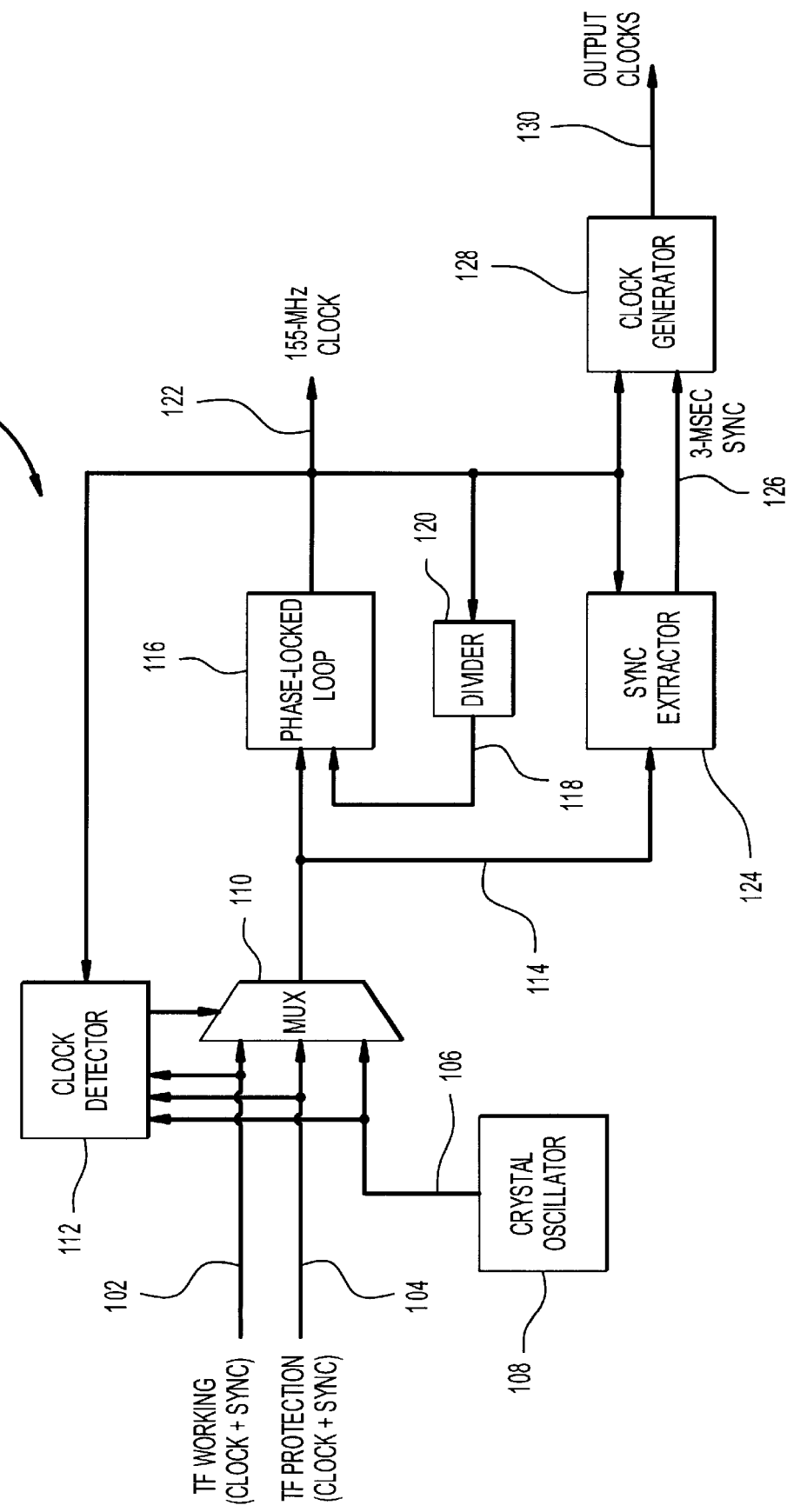

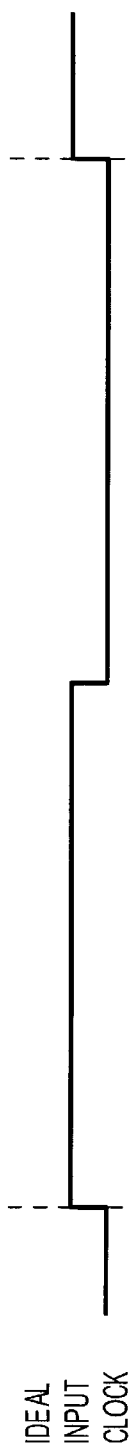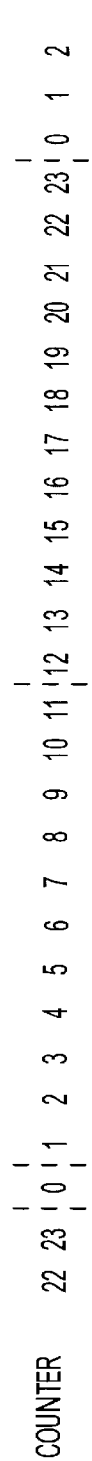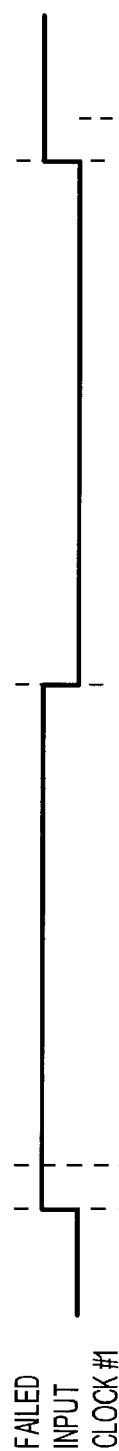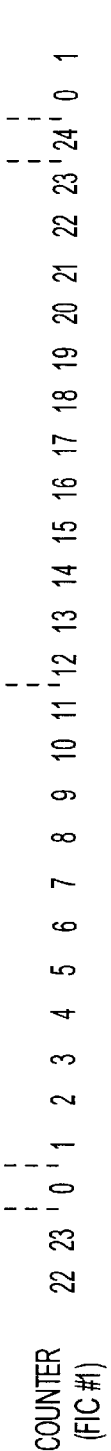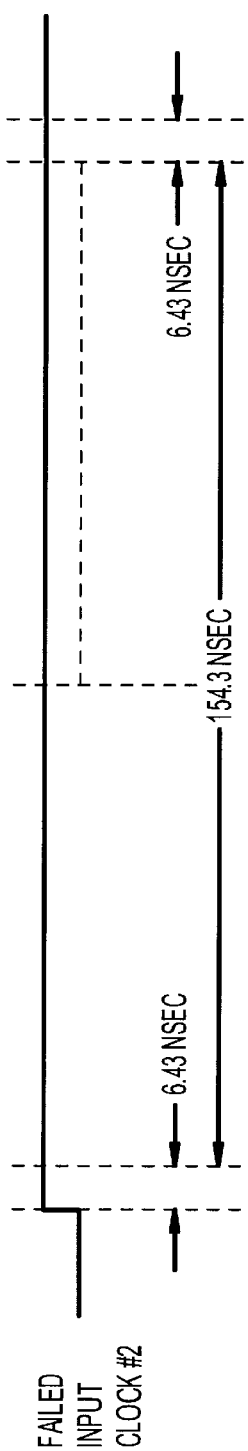

SWITCHING ALGORITHM FOR CLOCK DISTRIBUTION FUNCTION

BACKGROUND OF THE INVENTION

1. Field of the Invention

The present invention relates to the design of transmission systems, and, in particular, to the provision of redundant clock signals for fault protection.

2. Description of the Related Art

Transmission systems rely on clock signals to control the operations of the processors and other hardware components that make up the transmission system. In order to maintain system operations in the event of a failure or other degradation in a particular clock signal, transmission systems are often designed with one or more redundant or backup clock signals that can take over the responsibility for controlling system operations from the failed clock signal.

It is desirable to provide a clock-signal switch protection scheme for automatically switching from a failed clock signal to a backup clock signal without interrupting system operations. Such switching is referred to as hitless switching.

SUMMARY OF THE INVENTION

The present invention is directed to a clock-signal switch protection scheme designed to achieve hitless—or at least near hitless—switching in the event of failure of a clock signal that had been used to control transmission system operations.

In one embodiment, the present invention is a clock-signal switch protection scheme, comprising the steps of (a) generating an output clock signal from a first input clock signal using a phase-locked loop (PLL); (b) using the output clock signal to detect failures in the first input clock signal; and (c) if a failure in the first input clock signal is detected, then switching to use a second input clock signal to generate the output clock signal.

According to another embodiment, the present invention is a clock signal distribution circuit, comprising (a) a multiplexer, configured to receive two or more input clock signals and to provide one of the input clock signals as a selected input clock signal; (b) a phase-locked loop with a divider, configured to generate an output clock signal from the selected input clock signal; and (c) a clock detector, configured to use the output clock signal to detect failures in the selected input clock signal and to switch the multiplexer to provide an other of the input clock signals as the selected input clock signal, if a failure in the first input clock signal is detected.

BRIEF DESCRIPTION OF THE DRAWINGS

Other aspects, features, and advantages of the present invention will become more fully apparent from the following detailed description, the appended claims, and the accompanying drawings in which:

FIG. 1 shows a block diagram of a clock/synch distribution (CSD) circuit, according to one embodiment of the present invention;

FIG. 2 shows timing diagrams demonstrating the processing of the failure detector in the CSD circuit of FIG. 1;

DETAILED DESCRIPTION

Figure 3:
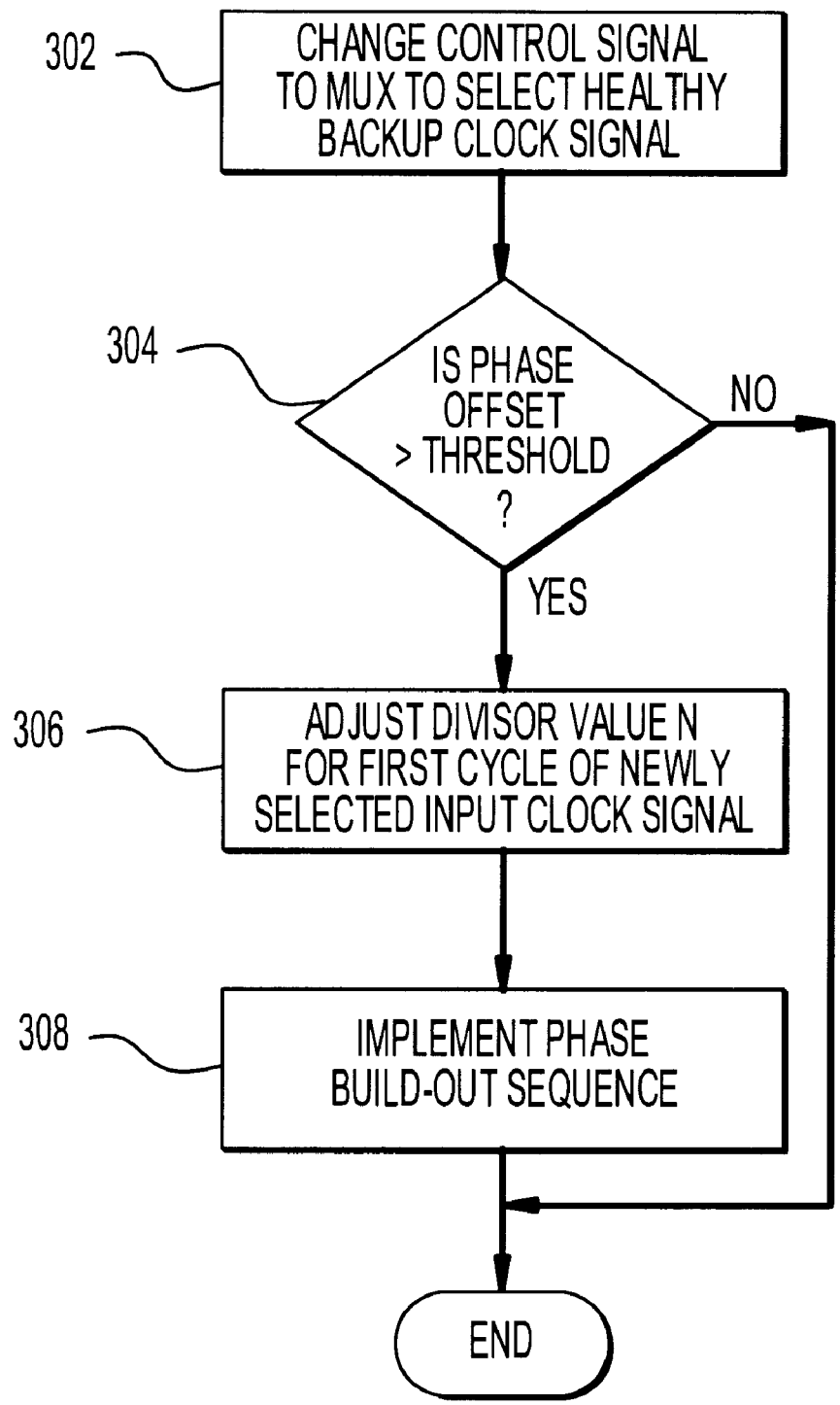
FIG. 3 shows a flow diagram of the protection switching processing implemented by the CSD circuit of FIG. 1 after detection of a failure in the selected input clock signal, according to one embodiment of the present invention.

FIG. 1 shows a block diagram of a clock/synch distribution (CSD) circuit 100, according to one embodiment of the present invention. CSD circuit 100 is part of a larger transmission system that is not shown in FIG. 1. The general purpose of CSD circuit 100 is to receive a 6.48-MHz input clock signal (generated external to CSD circuit 100) that is embedded with a 3-msec synchronization (sync) signal, extract the sync signal from the input clock signal, generate one or more output clock signals from the 6.48-MHz input clock signal (including output clock signals having frequencies other than 6.48 MHz), and distribute those clock and sync signals to processors (e.g., microprocessors, ASICs) and other hardware components of the transmission system.

CSD circuit 100 is designed to provide clock-signal protection switching in case of failure of the input clock signal. In particular, CSD circuit 100 receives two input clock signals 102 and 104, each of which is a 6.48-MHz clock signal with an embedded 3-msec sync signal generated by a different timing function (TF) that is external to CSD circuit 100. In addition, CSD circuit 100 has a local crystal oscillator 108 that generates a 6.48-MHz local input clock signal 106 that does not have an embedded sync signal.

All three input clock signals 102–106 are input to multiplexer (mux) 110, which also receives a control signal from failure detector 112 that determines which of the three input clocks signals is output from mux 110 as the selected clock signal 114. By definition, at power up, working clock signal 102 is selected by failure detector 112 to control system operations, while protection clock signal 104 and local clock signal 106 are treated as backup clock signals.

CSD circuit 100 is provided with two levels of clock protection: (1) if working clock signal 102 fails, then protection switching is implemented to switch to protection clock signal 104, and (2) if protection clock signal 104 fails (e.g., while working clock signal 102 is still failed), then protection switching is implemented to switch to local clock signal 106. Depending on the implementation, if, after a failure of working clock signal 102 and a resulting protection switch to protection clock signal 104, working clock signal 102 becomes healthy again, failure detector 112 may either switch back under software control to working clock signal 102 right away or maintain operations with protection clock signal 104 until a failure in protection clock signal 104 is detected, in which case, failure detector 112 switches back to working clock signal 102. In either case, failure detector 112 switches to local clock signal 106 only as a last resort (i.e., if each of working clock signal 102 and protection clock signal 104 fails or is otherwise absent).

The selected clock signal 114 is one of the two inputs to phase-locked loop (PLL) 116, which also receives a feedback clock signal 118 that is generated by programmable divider 120 from the signal generated by PLL 116. Under normal operating conditions, programmable divider 120 has its divisor value (N) set to 24. As such, PLL 116 and divider 120 operate to generate a 155-MHz output clock signal 122, whose phase is synchronized with the phase of the 6.48-MHz selected clock signal 114, where (24*6.48) is equivalent to about 155. PLL 116 may be any conventional phase-locked loop circuit, such as one having a series combination of a phase detector (PD), loop filter, and voltage-controlled oscillator (VCO), with the feedback signal 118 from the VCO to the PD being provided by divider 120.

At the same time, sync extractor 124 uses the 155-MHz output clock signal 122 generated by PLL 116 to extract the 3-msec sync signal 126 from the selected clock signal 114, and clock generator 128 uses both the 155-MHz output clock signal 122 and the extracted 3-msec sync signal 126 to generate one or more other output clock signals 130 having frequencies other than 6.48 MHz and 155 MHz, as may be needed to control the operations of other processors and components of the transmission system. Clock generator 128 may be implemented with programmable clock dividers, similar to divider 120, or with fixed clock dividers, depending on the application.

Failure detector 112 receives the 155-MHz output clock signal 122 and monitors all three 6.48-MHz input clock signals 102–106. In addition to controlling which input clock signal is selected by mux 110, failure detector 112 also controls the value of divisor N set in divider 120. Failure detector 112 is responsible for (1) detecting a failure in the clock signal selected by mux 110 and (2) automatically switching to a backup clock signal to continue system operations without interruption. These failure detection and protection switching operations are described in firmer detail in the next two sections.

Failure Detection

For working and protection input clock signals 102 and 104, failure detector 112 verifies that each signal is a two-level signal having an appropriate period. In particular, for each input clock signal, failure detector 112 has a counter that gets reset to 0 at the start of each cycle of the input clock signal and incremented at the start of each cycle of the 155-MHz output clock signal 122. In addition, failure detector 112 verifies that each input clock signal achieves different signal levels after a specified number of cycles of the 155-MHz output clock signal 122. In addition, failure detector 112 verifies the activity of local clock signal 106 by checking whether at least one clock transition occurs during a specified time period.

FIG. 2 shows timing diagrams demonstrating this processing of failure detector 112. Diagram (A) shows the timing of an ideal 6.48-MHz input clock signal having a 50% duty cycle. As indicated, the period between rising edges of the ideal 6.48-MHz input clock signal is 154.3 nsec. Diagram (B) shows the timing of an ideal 155-MHz output clock signal 122 having a 50% duty cycle and synchronized to the input clock signal in Diagram (A) with zero phase offset. As indicated, the period between rising edges of the ideal 155-MHz output clock signal 122 is 6.43 nsec.

The rising edge of each 154.3-nsec cycle of the 6.48-MHz input clock signal causes a reset pulse (see Diagram (C) in FIG. 2), that resets a counter in failure detector 112. The counter is incremented at the rising edge of each 6.43-nsec cycle of the 155-MHz output clock signal 122. Diagram (D) shows the counter values for the ideal input clock signal of Diagram (A). The counter is reset to 0 at the rising edge of each cycle in the input clock signal of Diagram (A) and incremented at the rising edge of each cycle in the output clock signal 122 of Diagram (B). Before the counter gets incremented to 24, the rising edge of the next cycle in the input clock signal of Diagram (A) causes another reset pulse in Diagram (C), which resets the counter value of Diagram (D) back to 0.

Diagram (E) shows the timing of a failed input clock signal that demonstrates one type of clock failure detected by failure detector 112. For some reason (and, for purposes of the clock protection scheme of the present invention, the reason is irrelevant), the rising edge of the next cycle in Failed Input Clock Signal #1 is delayed. As a result, the counter in failure detector 112 reaches a value of 24, as shown in Diagram (F). Whenever the counter reaches 24, failure detector 112 determines that a failure has occurred in the corresponding input clock signal. Analogously, if the rising edge of the next cycle in an input clock signal were to arrive too early, the counter would be reset to 0 before reaching 23 and failure detector 112 would again determine that a clock failure had occurred. This clock monitoring function of failure detector 112 is designed to detect changes in the frequency of the input clock signals. In alternative embodiments, the maximum counter value may be allowed to deviate slightly from 23 (e.g., anywhere from 22 to 24) during normal operations without triggering a failure condition.

The other clock monitoring function implemented by failure detector 112 is to detect when an input clock signal stays high or low for too long. This may occur for example in the case of a total failure in the input clock signal, where the signal level stays low or high indefinitely. This type of failure is detected by failure detector 112 by comparing the signal levels of the input clock signal after a specified number (e.g., 21) of cycles of the 155-MHz output clock signal 122. The number of output clock signal cycles is selected to take into account expected variations in duty cycle of the input clock signal. Under normal circumstances, the signal level of the input clock signal just after a rising edge (e.g., when the counter value is reset to 0) should be different from the signal level of the input clock signal 21 cycles of the 155-MHz output clock signal 122 later (e.g., when the counter value is 21). If failure detector 112 determines that the input clock signal level has not changed over that specified period of time, failure detector 112 determines that a clock failure has occurred. This clock monitoring function of failure detector 112 is designed to detect total failures in the input clock signals. Although the first clock monitoring function that monitors the counter for values over 23 would eventually detect such a total failure in an input clock signal, the second clock monitoring function does so faster (i.e, at cycle 21 rather than at cycle 24).

If a failure is detected in the input clock signal that is currently selected by mux 110 to control system operations, failure detector 112 takes the necessary actions to switch to another clock signal, as described in the next section.

Protection Switching

FIG. 3 shows a flow diagram of the protection switching processing implemented by CSD circuit 100 of FIG. 1 after detection of a failure in the selected input clock signal, according to one embodiment of the present invention. Protection switching for CSD circuit 100 involves three sets of actions that are designed to achieve a smooth transition from a failed input clock signal to a healthy backup input clock signal: (1) changing the control signal to mux 110 to change the selection of which input clock signal is output as selected clock signal 114, (2) controlling the divisor values N used by divider 120, as necessary, and (3) introducing incremental phase error, as needed, in a phase build-out sequence.

Changing the selection made by mux 110 (step 302 of FIG. 3) can be implemented using conventional techniques. For example, mux 110 may be a conventional 1-out-of-4 mux that can be controlled by a two-bit control signal, whose values dictate which input clock signal is selected (e.g., (00)⟹ working clock signal 102, (01)⟹ protection clock signal 104, and (10) or (11)⟹ local clock signal 106). If the failed input clock signal was working clock signal 102, then the newly selected input clock signal will be protection clock signal 104. If the failed input clock signal was protection clock signal 104, then (assuming that working clock signal 102 is also (still) failed), then the newly selected input clock signal will be local clock signal 106.

Although working clock signal 102, protection clock signal 104, and local clock signal 106 are all normally 6.48-MHz clock signals, there is no guarantee that they will be synchronized with zero phase offset between them. Rather, there will typically be some finite, non-zero phase offset between each pair of the input clock signals. During normal operations, failure detector 112 measures the phase offset between each pair of input clock signals. If that phase offset corresponds to more than one 6.43-nsec interval (step 304), then failure detector 112 adjusts the value of the divisor applied by divider 120 by the nearest integer number of 6.43-nsec intervals corresponding to that phase offset (step 306).

For example, for a switch from working input clock signal 102 to protection input clock signal 104, if the phase offset between the two input clock signals corresponds to an interval from −3.2 nsec to +3.2 nsec, the divisor value N is kept at 24. If, however, the phase offset corresponds to an interval from +3.2 nsec to +9.6 nsec, the divisor value N is set to 25 for the initial period after the transition from the working clock signal to the protection clock signal. Similarly, if the phase offset corresponds to an interval from +9.6 nsec to +16.1 nsec, the divisor value N is set to 26, and so on.

Analogously, if the phase offset between the input clock signals corresponds to an interval from −9.6 nsec to −3.2 nsec, the divisor value N is set to 23 for the initial period after the transition from the working clock signal to the protection clock signal. Similarly, if the phase offset corresponds to an interval from −16.1 nsec to −9.6 nsec, the divisor value N is set to 22, and so on.

By adjusting the divisor value N based on the phase offset between the failed and newly selected input clock signals for the initial cycle of the newly selected input clock signal after the transition, the output clock signals can be maintained without disruption. If, however, the divisor value N were to be retained at a value other than 24, PLL 116 would not be able to generate an output clock signal having the desired frequency of 155 MHz from the newly selected 6.48-MHz input clock signal. For example, if the divisor value N of 22 were retained, PLL 116 would eventually generate a 143-MHz output clock signal, where (22*6.48) is equivalent to about 143. As such, failure detector 112 resets the divisor value N back to 24 after the initial cycle of the newly selected input clock signal.

However, since there was a phase offset between the failed input clock and the newly selected input clock, there will also be a phase offset between the newly selected input clock and the output clocks (122, 130) that had been generated from and synchronized with the failed input clock. To reduce this phase offset, failure detector 112 implements a phase build-out sequence (step 308) in which a specified amount of phase error (e.g., equivalent to 6.43 nsec) is introduced at specified intervals (e.g., every 1 msec) until the remaining phase offset is reduced to within a range where PLL 116 can complete the process of reducing the phase offset to essentially zero. A gradual phase build-out sequence is intended to keep the slope of the phase shift to within an acceptable level.

Clock Detector

Figure 4:
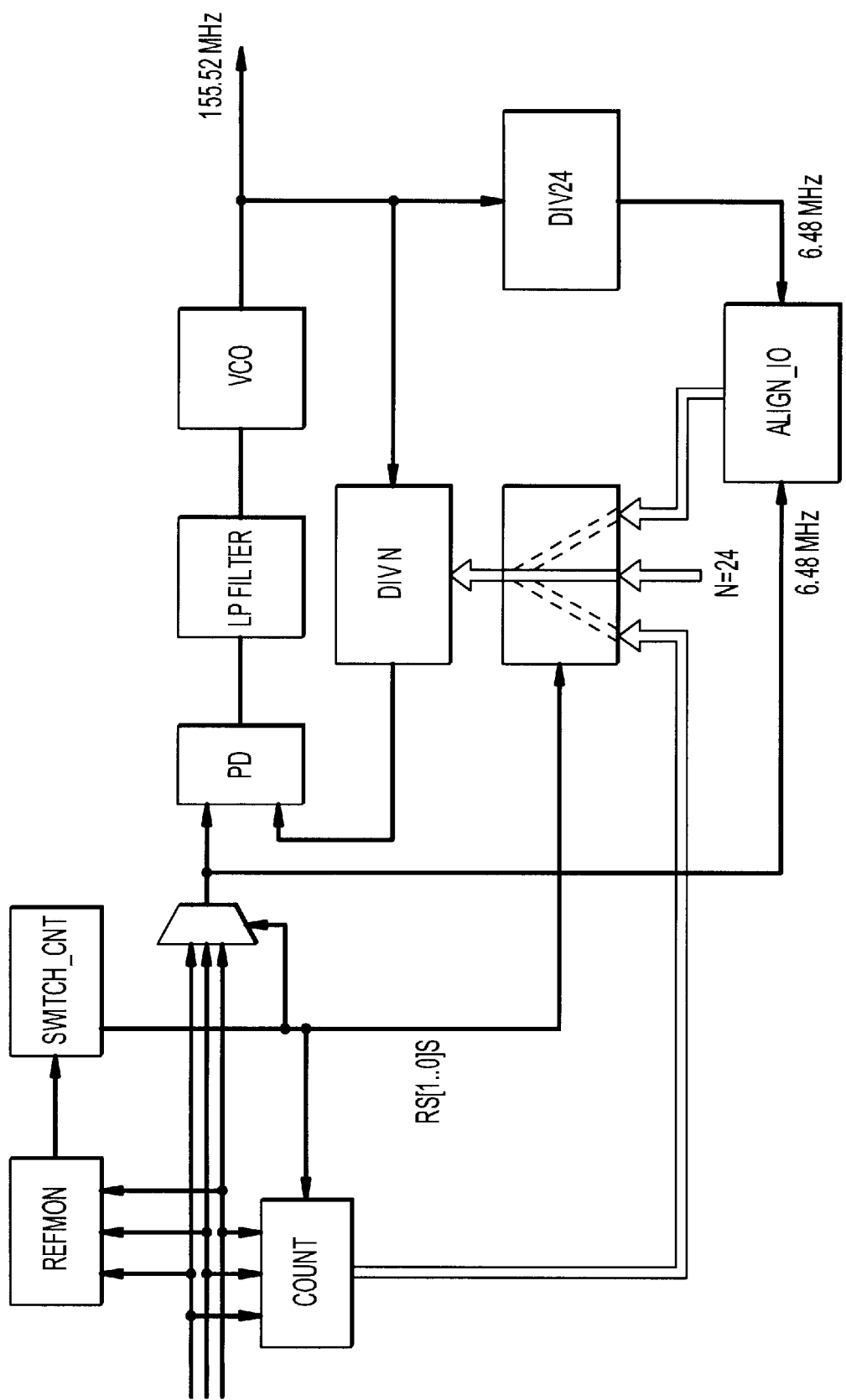
FIGS. 4–6 show details of parts of the CSD circuit of FIG. 1.

FIG. 4 shows a detail of part of CSD circuit 100 of FIG. 1. In particular, clock detector 112 of FIG. 1 is implemented using the blocks identified as REFMON, COUNT, SWITCH_CNT, and ALIGN_IO, while PLL 116 of FIG. 1 is implemented using the blocks identified as PD (phase detector), LP (low-pass) filter, and VCO (voltage controlled oscillator).

Figure 5:
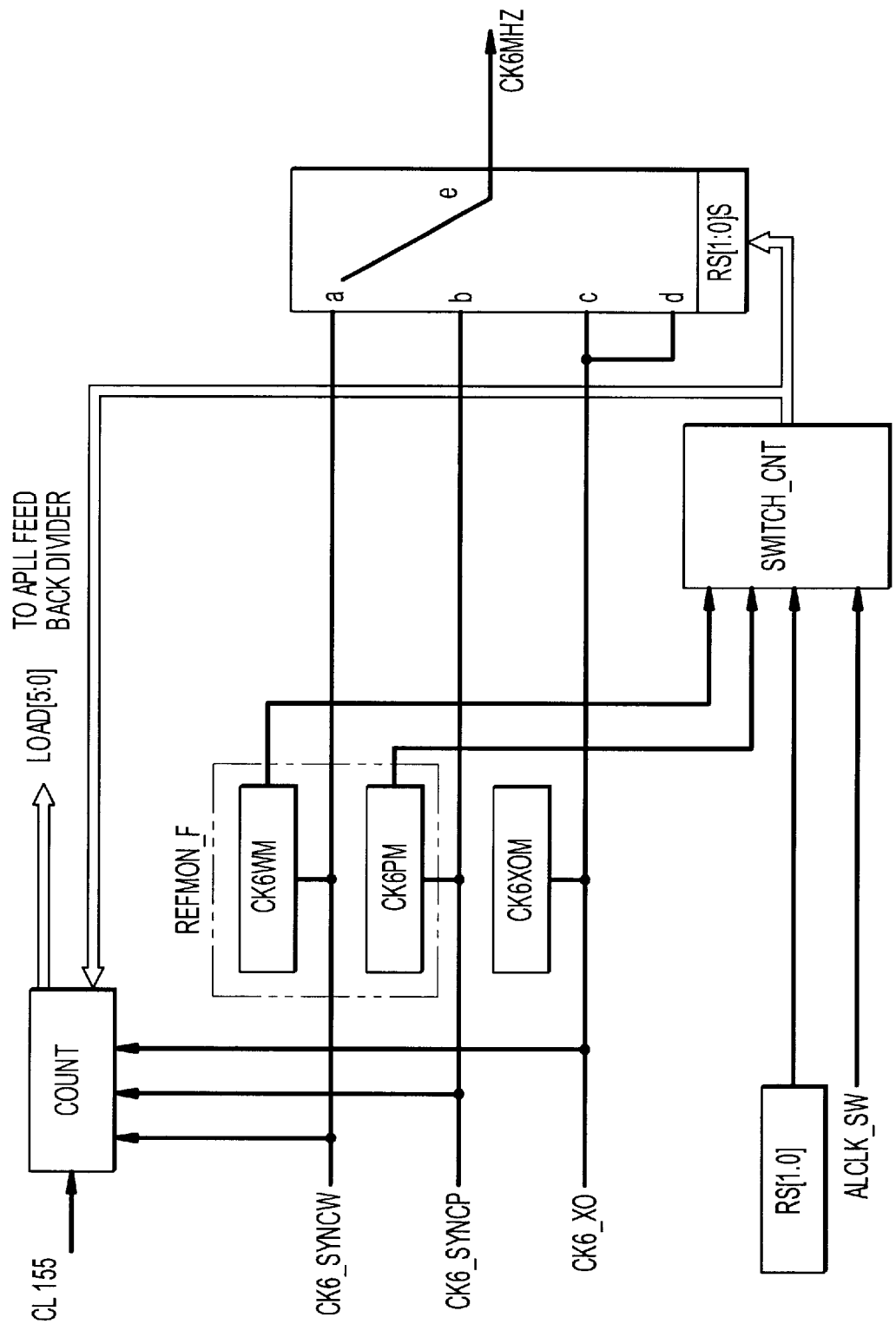

FIG. 5 shows a detail of part of FIG. 4. COUNT measures the phase deviation between the selected reference and the protection references. If, for example, W is selected, then COUNT measures the phase deviation between W and P and between W and XO. If a switch occurs, then the feedback counter will be reloaded once with a different value of N, as described earlier in the specification.

Figure 6:
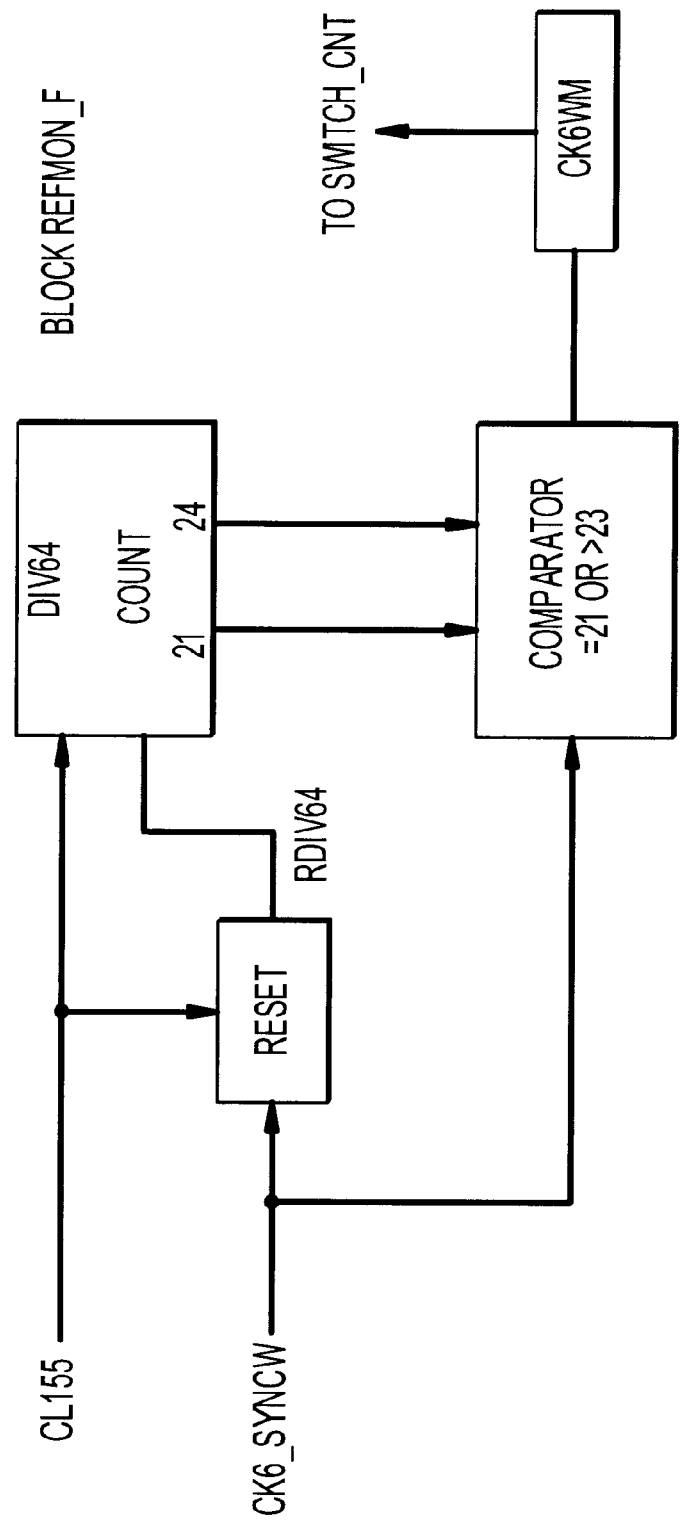

FIG. 6 shows a detail of the block REFMON in FIGS. 4 and 5. The block RESET in FIG. 6 detects the rising edge of the incoming reference and will make a pulse (6.43-nsec long) to reset the counter DIV64. The block COMPARATOR checks at count 21 if the level of the incoming signal is low, and check if the counter DIV64 reaches 24. In case of a failure, the block CK6NVM will initialize a switch from working to protection reference. The block REFMON is implemented two times, once per reference coming from the timing function.

Those skilled in the art will understand that the present invention is designed to provide hitless or at least near hitless switching of timing functions in case of detection of a failure in the working timing function. The tests are designed to detect such failures quickly and the responses are designed to minimize the impact of switching from one timing function to another.

Although the present invention was described in the context of a 6.48-MHz input clock signal having an embedded 3-msec sync signal and a 155-MHz output clock signal, those skilled in the art will understand that the present invention can be implemented for other frequencies of input clock signal, sync signal, and output clock signal, as well as for input clock signals that do not have embedded sync signals. In such alternative implementations, the normal divisor value applied by divider 120 may be different from 24.

Although the present invention has been described in the context of transmission systems, those skilled in the art will understand that the present invention can be implemented for applications other than transmission systems.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A clock-signal switch protection scheme, comprising the steps of:
    (a) generating an output clock signal from a first input clock signal using a phase-locked loop (PLL);
    (b) using the output clock signal to detect failures in the first input clock signal; and
    (c) if a failure in the first input clock signal is detected, then switching to use a second input clock signal to generate the output clock signal, wherein step (b) comprises the steps of:
        (1) initializing a counter based on the first input clock signal;
        (2) incrementing the counter based on the output clock signal; and
        (3) monitoring the value of the counter to detect a failure in the first input clock signal.

2. The clock-signal switch protection scheme of claim 1, wherein step (b) comprises the further step of determining whether the signal level of the first input clock signal at the beginning of a time period defined based on the output clock signal is sufficiently different from the signal level of the first input clock signal at the end of the time period.

3. The clock-signal switch protection scheme of claim 1, wherein, after switching to the second input clock signal, step (c) comprises the steps of:
   (1) adjusting a divisor value for the PLL based on phase offset between the first and second input clock signals; and
   (2) applying a phase build-out sequence.

4. The clock-signal switch protection scheme of claim 3, wherein, after switching to the second input clock signal, the divisor value is changed for only the first cycle of the second input clock signal.

5. The clock-signal switch protection scheme of claim 3, wherein the phase build-out sequence comprises the step of introducing a specified amount of phase error at a specified number of intervals.

6. The clock-signal switch protection scheme of claim 1, wherein:
   step (b) comprises the further step of determining whether the signal level of the first input clock signal at the beginning of a time period defined based on the output clock signal is sufficiently different from the signal level of the first input clock signal at the end of the time period; and
   after switching to the second input clock signal, step (c) comprises the steps of:
      (1) adjusting a divisor value for the PLL based on phase offset between the first and second input clock signals for only the first cycle of the second input clock signal; and
      (2) applying a phase build-out sequence, wherein the phase build-out sequence comprises the step of introducing a specified amount of phase error at a specified number of intervals.

7. An apparatus for implementing a clock-signal switch protection scheme, comprising:
   (a) a phase-locked loop, configured to generate an output clock signal from a first input clock signal;
   (b) means for using the output clock signal to detect failures in the first input clock signal; and
   (c) means for switching to use a second input clock signal to generate the output clock signal, if a failure in the first input clock signal is detected wherein means (b) is configured to:
      (1) initialize a counter based on the first input clock signal;
      (2) increment the counter based on the output clock signal; and
      (3) monitor the value of the counter to detect a failure in the first input clock signal.

8. A clock signal distribution circuit, comprising:
   (a) a multiplexer, configured to receive two or more input clock signals and to provide one of the input clock signals as a selected input clock signal;
   (b) a phase-locked loop with a divider, configured to generate an output clock signal from the selected input clock signal; and
   (c) a clock detector, configured to use the output clock signal to detect failures in the selected input clock signal and to switch the multiplexer to provide an other of the input clock signals as the selected input clock signal, if a failure in the first input clock signal is detected.

9. The clock signal distribution circuit of claim 8, wherein the clock detector is configured to:
   (1) initialize a counter based on the first input clock signal;
   (2) increment the counter based on the output clock signal; and
   (3) monitor the value of the counter to detect a failure in the first input clock signal.

10. The clock signal distribution circuit of claim 8, wherein the clock detector is configured to determine whether the signal level of the first input clock signal at the beginning of a time period defined based on the output clock signal is sufficiently different from the signal level of the first input clock signal at the end of the time period.

11. The clock signal distribution circuit of claim 8, wherein, upon detection of a failure in the selected input clock signal, the clock detector is further configured to:
   (1) adjust a divisor value for the divider based on phase offset between the failed input clock signal and the newly selected input clock signal; and
   (2) apply a phase build-out sequence.

12. The clock signal distribution circuit of claim 11, wherein, after switching to the other input clock signal, the divisor value is changed for only the first cycle of the other input clock signal.

13. The clock signal distribution circuit of claim 11, wherein the phase build-out sequence comprises the step of introducing a specified amount of phase error at a specified number of intervals.

14. The clock signal distribution circuit of claim 8, further comprising a local crystal oscillator, configured to generate a local input clock signal, wherein:
   the multiplexer is configured to receive an externally generated working input clock signal, an externally generated protection input clock signal, and the local input clock signal, and to provide, at power up, the working input clock signal as the selected input clock signal;
   the clock detector is configured to switch to the protection input clock signal upon detection of a failure in the working input clock signal; and
   the clock detector is configured to switch to the local input clock signal upon detection of a failure in the protection input clock signal, if the working input clock signal is already failed.

15. The clock signal distribution circuit of claim 8, wherein:
   the clock detector is configured to:
      (1) initialize a counter based on the first input clock signal;
      (2) increment the counter based on the output clock signal; and
      (3) monitor the value of the counter to detect a failure in the first input clock signal;
   the clock detector is further configured to determine whether the signal level of the first input clock signal at the beginning of a time period defined based on the output clock signal is sufficiently different from the signal level of the first input clock signal at the end of the time period;
   upon detection of a failure in the selected input clock signal, the clock detector is further configured to:
      (1) adjust a divisor value for the divider based on phase offset between the failed input clock signal and the newly selected input clock signal for only the first cycle of the other input clock signal; and (2) apply a phase build-out sequence, wherein the phase build-out sequence comprises the step of introducing a specified amount of phase error at a specified number of intervals; and further comprising a local crystal oscillator, configured to generate a local input clock signal, wherein:

the multiplexer is configured to receive an externally generated working input clock signal, an externally generated protection input clock signal, and the local input clock signal, and to provide, at power up, the working input clock signal as the selected input clock signal;

the clock detector is configured to switch to the protection input clock signal upon detection of a failure in the working input clock signal; and the clock detector is configured to switch to the local input clock signal upon detection of a failure in the protection input clock signal, if the working input clock signal is already failed.

16. A clock-signal switch protection scheme, comprising the steps of:

(a) generating an output clock signal from a first input clock signal using a phase-locked loop (PLL);

(b) using the output clock signal to detect failures in the first input clock signal; and (c) if a failure in the first input clock signal is detected, then switching to use a second input clock signal to generate the output clock signal, wherein step (b) comprises the step of determining whether the signal level of the first input clock signal at the beginning of a time period defined based on the output clock signal is sufficiently different from the signal level of the first input clock signal at the end of the time period.

17. A clock-signal switch protection scheme, comprising the steps of:

(a) generating an output clock signal from a first input clock signal using a phase-locked loop (PLL);

(b) using the output clock signal to detect failures in the first input clock signal; and (c) if a failure in the first input clock signal is detected, then switching to use a second input clock signal to generate the output clock signal, wherein, after switching to the second input clock signal, step (c) comprises the steps of:

(1) adjusting a divisor value for the PLL based on phase offset between the first and second input clock signals; and (2) applying a phase build-out sequence.

18. The clock-signal switch protection scheme of claim 17, wherein, after switching to the second input clock signal, the divisor value is changed for only the first cycle of the second input clock signal.

19. The clock-signal switch protection scheme of claim 17, wherein the phase build-out sequence comprises the step of introducing a specified amount of phase error at a specified number of intervals.

* * * * *